US011825971B2

(12) United States Patent
Holzer (10) Patent No.: US 11,825,971 B2
(45) Date of Patent: Nov. 28, 2023

(54) RECEIVING DEVICE FOR PARCELS OR PACKAGES DELIVERED BY AIR

(71) Applicant: Nikolaus Holzer, Berlin (DE)

(72) Inventor: Nikolaus Holzer, Berlin (DE)

(*) Notice: Subject to any disclaimer, the term of this patent is extended or adjusted under 35 U.S.C. 154(b) by 1094 days.

(21) Appl. No.: 16/498,235

(22) PCT Filed: Mar. 26, 2018

(86) PCT No.: PCT/DE2018/100276
§ 371 (c)(1),
(2) Date: Sep. 26, 2019

(87) PCT Pub. No.: WO2018/177474
PCT Pub. Date: Oct. 4, 2018

(65) Prior Publication Data
US 2020/0046156 A1     Feb. 13, 2020

(30) Foreign Application Priority Data
Mar. 30, 2017     (DE) .......................... 102017106925.9

(51) Int. Cl.
*A47G 29/14*     (2006.01)
*B64C 39/02*     (2023.01)
(Continued)

(52) U.S. Cl.
CPC .......... *A47G 29/141* (2013.01); *B64C 39/024* (2013.01); *B64F 1/32* (2013.01);
(Continued)

(58) Field of Classification Search
CPC ............ A47G 29/141; A47G 2029/144; A47G 2029/145; A47G 2029/149; A47G 29/14;
(Continued)

(56) References Cited

U.S. PATENT DOCUMENTS

2016/0033966 A1*   2/2016   Farris ................... A47G 29/122
                                                    701/16
2016/0159496 A1    6/2016   O'Toole
(Continued)

FOREIGN PATENT DOCUMENTS

WO     WO2017196190 A1    11/2017
WO     WO2018067327 A1    4/2018

OTHER PUBLICATIONS

English Translation of International Search Report in PCT/DE2018/100276 dated Jun. 26, 2018.
(Continued)

*Primary Examiner* — Richard M Camby
(74) *Attorney, Agent, or Firm* — Ralph E. Jocke; WALKER & JOCKE (57) ABSTRACT

Exemplary embodiments relate to an apparatus comprising a receiving device (200) configured to receive a package (1) delivered via an airborne drone (100). The receiving device (200) includes a receptacle (201), an optical scanner (208), a transceiver (207), and at least one light emitter (204) in operative connection with a computer (203). The optical scanner (208) is operative to read optical indicia that includes a delivery code. The transceiver (207) is operative to receive a signal that includes a verification code and an encrypted one time code from the drone (100). If the verification code has a predetermined relationship with the delivery information, the computer (203) is operative to decrypt the one time code and to transmit an encrypted optical signal through the at least one light emitter (204) whereby the drone (100) is enabled to identify the receiving device (200) and to position the package (1) therein.

20 Claims, 5 Drawing Sheets

(51) Int. Cl.
| | |
|---|---|
| G05B 15/02 | (2006.01) |
| G05D 1/00 | (2006.01) |
| H04L 9/32 | (2006.01) |
| H04L 9/40 | (2022.01) |
| H04W 12/04 | (2021.01) |
| B64F 1/32 | (2006.01) |
| H04W 12/03 | (2021.01) |
| G06Q 50/28 | (2012.01) |
| B64U 10/13 | (2023.01) |
| B64U 101/60 | (2023.01) |

(52) U.S. Cl.
CPC ........... *G05B 15/02* (2013.01); *G05D 1/0016* (2013.01); *G05D 1/0094* (2013.01); *H04L 9/3228* (2013.01); *H04L 63/0442* (2013.01); *H04W 12/03* (2021.01); *H04W 12/04* (2013.01); *A47G 2029/144* (2013.01); *A47G 2029/145* (2013.01); *A47G 2029/149* (2013.01); *B64U 10/13* (2023.01); *B64U 2101/60* (2023.01); *B64U 2201/10* (2023.01); *B64U 2201/20* (2023.01); *G06Q 50/28* (2013.01); *H04L 2209/80* (2013.01)

(58) Field of Classification Search
CPC ......... B64C 39/024; B64F 1/32; G05B 15/02; G05D 1/0016; G05D 1/0094; H04L 9/3228; H04L 63/0442; H04L 2209/80; H04W 12/03; H04W 12/04; B64U 10/13; B64U 2101/60; B64U 2201/10; B64U 2201/20; G06Q 50/28
See application file for complete search history.

(56) References Cited

U.S. PATENT DOCUMENTS

| | | |
|---|---|---|
| 2017/0073085 A1 | 3/2017 | Tremblay et al. |
| 2017/0227470 A1* | 8/2017 | Cesarano ................. G08G 9/02 |
| 2017/0283057 A1* | 10/2017 | Thompson ............ B64C 39/024 |

OTHER PUBLICATIONS

English Translation of Written Opinion of International Search Authority in PCT/DE2018/100276.

* cited by examiner

RECEIVING DEVICE FOR PARCELS OR PACKAGES DELIVERED BY AIR

TECHNICAL FIELD

The exemplary embodiments concern a receiving device for parcels or packages that are delivered by air.

BACKGROUND

It is a known at the time of this application to deliver parcels and packages by air via a drone. This is carried out through a completely automatic system, and does not require a human to act as a parcel courier, or a mail man. The parcels or packages are no longer delivered to a mailbox installed at the entrance of a house or building. Rather in the typical situation, the device that receives the parcel or package is installed on a balcony or window of a house or building. As such, the conventional delivery of a parcel or package by a human courier is replaced by delivery of the parcel or package by a drone, also publicly referred to as a "parcel copter." A drone has the ability to deliver packages or parcels to locations that are positioned well above ground level, for example, a receiving device on the exterior of a high-rise building. However, this fully automated delivery by an autonomously flying and autonomously navigating drone is subject to a variety of dangers, including theft of the drone or other sabotage to the drone or parcel or package being delivered.

A commonly known problem with drone delivery of parcels or packages is that the drone needs to be navigated very precisely and accurately in order to position the drone in close proximity to the receiving device where the parcel or package is to be delivered, usually within 1 meter of the receiving device. Well-known navigation systems are based on radio direction finders (RDF) and on satellite-based navigation. In theory, satellite-based navigation enables extremely precise determination of an object or an individual's location. However, use of such a satellite-based navigation system for drone delivery of parcels or packages is sometimes in conflict with the national security interests of the operator state in which the drone is in use. This is because operator states sometimes require that the signals of the satellite-based navigation systems must be artificially distorted resulting in the communication of an imprecise or corrupted signal. Therefore, the exact pinpoint location of the object or person being tracked cannot be obtained. This intentional signal corruption is referred to as "Selective Availability."

Selective Availability signal corruption was halted in the early 2000's. However, in certain instances GPS systems still communicate extremely imprecise location signals. These imprecise signals are not due to a problem with the satellite-based navigation system, but rather are a deliberate interference to prevent enemy forces from being able to use the operator state's satellite-based navigation systems. In order to overcome the problems associated with Selective Availability, and to increase the precision of satellite-based navigation systems, systems are known that use an object such as a mast or a beacon that constantly measures its own position relative to the distorted signals of the satellite-based navigation system. This system allows for the real-time correction of signals from the satellite-based navigation systems by measuring the person's or other object's position relative to the mast or beacons. However, the use of such a system poses a further risk of sabotage because false or fake signals may be communicated by an individual attempting to hijack the drone or intercept the parcels or packages which the drone is delivering.

Typical risks of sabotage to the fully automated drone delivery system include the interception of parcels or packages intended for others. For example, a perpetrator may manipulate a device to transmit communication signals so that drones within the vicinity of the perpetrator's device are tricked into delivering parcels or packages to the perpetrators device. Such sabotage can lead to significant losses in value to the intended recipient of the parcel or package because the intercepted parcel or package may include contents of substantial monetary or other value. Therefore, it is important that the drones, like human couriers, understand their delivery environment and, when necessary, be able to detect a potential perpetrator attempting to intercept parcels or packages intended for another, thereby safely delivering the parcel or package to the intended recipient.

Another potential risk of sabotage is the delivery of unsolicited, or unwanted packages. In contrast to the delivery of letters or parcels to a mailbox, the delivery of packages of greater size and volume than a simple letter permits the unsolicited delivery of undesired material or potentially dangerous material such as bombs contained within the package. Absent human intervention, the fully automated drone delivery system is not capable of determining the dangers associated with a particular package, and thus includes no natural monitoring function. Therefore, a potential perpetrator is more likely to sabotage the system by exploiting this deficiency.

Yet another danger of sabotage is the delivery of the package or parcel to the incorrect address. This may result from the recorded postal address no longer matching the actual location and postal address of the receiving device of the intended recipient. As such, there is a disconnect between the recorded postal address of the recipient and the geo-coordinates of the delivery device owned by the intended recipient (i.e., the new location of the intended recipient's delivery device). It should be understood that the exact geo-coordinates of a window or a balcony of a delivery device, especially for large houses or buildings with a large number of housing units is much more precise than the postal address of a specific unit within the structure. Therefore, there is also a disconnect between the postal address of the intended recipient and the geo-coordinates of the intended recipient's receiving device because the postal address may be located in the lobby of an apartment building or the postal address may correspond to a mailbox that is part of a mailbox bank that is not located at the intended recipients actual residence where the receiving device is located.

At the time of the is application, geo-coordinates of a receiving device attached to a window or balcony of a specific unit of a house or building are not recorded in any known register. Further, although the geo-coordinates of a balcony or window of a specific unit within a house or building are more precise than a postal address, the geo-coordinates are much more susceptible to being distorted by a slight change in the geo-coordinates than a postal address. For instance, a perpetrator could be the neighbor of the individual with the intended receiving device, and by using the postal address of the individual, and potentially their credit card, the perpetrator could deceive a drone into delivering the parcels or packages to the perpetrators receiving device as opposed to the intended recipient's receiving device. Without a complete register of the geo-coordinates of delivery devices, it is very difficult to prevent such sabotage.

Still further, the drone itself can be the target of sabotage such as vandalism or theft. As drones are very small aircraft, they are at risk of being captured by a perpetrator during the package delivery process. In the simplest case, when a parcel is delivered, a net or the like could be thrown onto the drone, inevitably causing the drone to crash and to become susceptible to theft. Such sabotage becomes an even further problem if the software that operates the drone is obtained and accessed by the perpetrator, potentially allowing the perpetrator to identify numerous cryptographic keys.

The prior art of fully automated drone delivery systems includes a variety of theoretically feasible systems to protect against unwanted delivery, interception of deliveries, and against drone sabotage and theft. The prior art also includes systems for precise navigation and methods for delivering a parcel or package containing sensitive content through a fully automated drone system. However, all these systems and methods have proved insufficient to solve the problems in the prior art, or the known systems require a very large capital investment for use of artificial intelligence and supporting systems for navigation. The prior art also includes mechanized systems which perform a docking maneuver with the drone for delivery of parcels and packages.

German laid open publication DE 10 2014 105 583 A1 discloses a device which is designed as a horizontally movable stage, as a vertically movable stage, or as a scissor mechanism in order to receive a parcel from a drone. It is proposed that the drone hands over the parcel or package through a process that is similar to a handshake between the drone and the stage. The German publication discloses that a fully automated delivery system is only economically feasible when a large number of recipients have the necessary equipment to receive an automated delivery of parcels or packages. The closer the deliverer and the recipient are to each other results in a more efficient system. As such, a fully automated delivery system of this sort is more appropriate for areas with populations of high density such as a high-rise housing complex, rather than less densely populated areas. However, in most instances, high-rise housing complexes are more likely to attract residents with lower incomes. Therefore, installing a system for the reception of parcels or packages by automated drone delivery, which requires an expensive receiving device capable of sophisticated mechanical interaction with a drone, is expected to fail because of the high costs of such a receiving device.

In addition, the receiving devices must be arranged on the exterior of a high-rise building or other structure. As such, the receiving devices require sufficient mechanical support for attachment to the exterior. For a receiving device that extends 1-meter outward from the exterior of the structure to which it is attached, the necessary wall support members for such a receiving device are required to be able to withstand a load of up to 3 kilograms per 1-meter in length, thus creating a torque of 30 Nm, which is relatively high.

It is disclosed by Applicant herein that in the future, parcels or packages delivered by fully automated drone delivery systems will be wrapped in a simple Velcro band and have a magnetic plate attached to the Velcro band. It is further disclosed by Applicant herein that, in the future, the drone will have a cable or rope with an electrically insulated interior and include an electromagnet connected to the end of the cable. As such, the electromagnet attached to the cable will adhere to the magnetic plate attached to the Velcro band, which will allow the drone to pick up the package and transport the package for delivery. Immediately prior to the delivery, the drone will likely extend the cable to a length of about 2 meters or more with the help of a small winch. With the cable extended, the drone will be able to maneuver the parcel or package suspended in the air and will be able to stop the package or parcel from moving in the air through an automated flight maneuver. The drone will be able to precisely place the parcel or package in the receiving device by disconnecting the electromagnet from the magnetic plate attached to the Velcro band. This depositing maneuver may be similar to the landing of a probe on the surface of Mars through the use of an "Air Crane."

If the cable gets caught on an object during the delivery process as disclosed by Applicant herein, or a perpetrator attempts to pull the cable to capture the drone, the drone will release the thin rope from the winch and will be able to escape. Drone functions of this sort are currently made possible through the use of the robots created at Boston Dynamics, Inc. in the United States. These robots have already successfully autonomously performed very complex, automated running movements. The expected necessary agile maneuverability of the drone and the necessity to release the delivery cable are possible through the use of robots created at Boston Dynamics, Inc. Therefore, at least these risks of sabotage to, and theft of, the drone may to be overcome.

German patent application DE 10 2015 104 052 A1 discloses a method for transferring a shipment by an unmanned transport device. The publication addresses the problems associated with the precise and accurate geo-coordinates of the receiving device that are necessary for drone delivery systems. This publication discloses the use of a directional beam or "pairing" system for near field navigation. It is also disclosed that the drone and the receiving device exchange coded communication for authorization. The pairing system is broadly disclosed as being possible with any type of signal transmission, for example, the well-known signals of WLAN, Bluetooth®, and UMTS networks. However, the very short wavelengths of the signals (i.e., wavelengths in the range of about 10 cm with frequencies in the range of 2400 MHz) may be suitable for near field navigation, but these short wavelength signals are less suited for a fully automated drone delivery system because the [spatial resolution] maximum signal transmission distance of 10 meters is too low.

German patent application DE 10 2015 104 052 A1 further discloses that in order to achieve the shortest possible time for automated drone delivery of parcels or packages, it is necessary that the receiving devices have a very small number of mechanical functions for receiving parcels or packages, the least possible amount of configuration (such as integration into a computer network), and the least possible amount of personal identity information requirements necessary for establishing geo-coordinates.

Automated drone delivery systems and their components may benefit from improvements.

DISCUSSION

Therefore, the object of some exemplary embodiments is to provide a receiving device for parcels or packages that can be set up and operated with minimal mechanization and minimal configuration effort. Further, the object of some exemplary embodiments is achieved by a receiving apparatus that includes a housing or receptacle that protects against weather from the surrounding environment. The exemplary housing further includes an opening for inserting a parcel or package. The exemplary receiving apparatus further includes an optical signal device or a light emitter which emits signals preferably in the infrared range that illuminate the opening. In exemplary embodiments, the optical signal device is positioned in the housing and is also protected from the weather. The exemplary receiving apparatus further includes a device or transceiver for receiving wirelessly transmitted signals. The exemplary receiving apparatus also includes a device or optical scanner for the wired, optical, or wireless reception of authorization information such as cryptographic keys and delivery information. After an initial identification process, the authorization and delivery information are transmitted in an optical signal to the drone as it approaches to enable the drone to successfully locate the opening of the housing and to place the package or parcel in the housing.

In exemplary embodiments, the transceiver receives a signal sent by the drone that corresponds to, and verifies, delivery information or authorization information that was input into the receiving device by the optical scanner, also referred to as the device for wired, optical, or wireless reception of authorization information. If the verification code received by the transceiver corresponds to the delivery or authorization information input into the receiving device by the device for wired, optical or wireless reception of authorization information, the optical signaling device is caused to emit an encrypted signal that includes the delivery or authorization information. The encrypted signal illuminates the opening to the receiving apparatus making the opening of the receiving apparatus noticeable to the drone.

Further advantageous embodiments are disclosed herein.

BRIEF DESCRIPTION OF DRAWINGS

FIG. 3.1 shows an exemplary drone in a delivery approach to an exemplary alternative receiving device for parcels or packages with a package hanging on a loosened rope.

FIG. 3.2 shows the exemplary drone and the exemplary alternative receiving device from FIG. 3.1 immediately after delivery.

DETAILED DESCRIPTION

Figure 1:
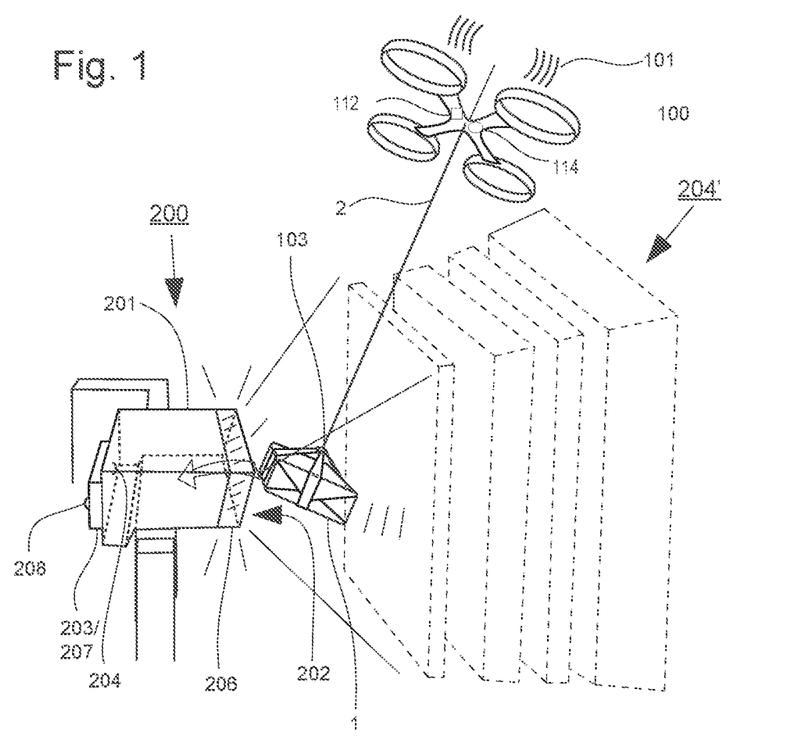
FIG. 1 shows an exemplary drone in a delivery approach to an exemplary receiving device for parcels or packages with a package hanging on a loosened rope.

FIG. 1 shows an exemplary delivery of a parcel or package 1 by an exemplary drone 100 to an exemplary receiving device 200. This first embodiment of the exemplary receiving device 200 that receives parcels or packages delivered by air comprises: a weatherproof housing or receptacle 201 which has an opening 202 for inserting a parcel or package 1; an optical signaling device also referred to as an emitter or a light emitting diode 204 which emits signals that illuminate the opening 202, preferably in the infrared range, and is protected in the housing 201 from the weather and the emissions of the infrared signals; a device or transceiver 207 for receiving wirelessly transmitted signals, such as verification information from an approaching drone 100; a device or optical scanner 208 for the wired, optical, or wireless reception of authorization, such as cryptographic keys and delivery information that prepare the receiving device 200 for delivery of a parcel or package 1.

Devices that are connected to the internet are often susceptible to attacks by computer hackers. Therefore, receiving devices that are connected to the Internet are susceptible to being compromised by computer hackers attempting to access information for an approaching delivery. In the exemplary embodiments, operation of the receiving device 200 without connection to the internet is advantageous as it helps eliminate the threat of computer hackers compromising drones during delivery. In order to avoid integrating the receiving device into an internet-based network, the exemplary device 208 for the wired, optical, or wireless reception of authorization information may be a simple barcode reader or QR Code® reader or the like, allowing the device 208 to read and obtain optical indicia in the form of encrypted alphanumeric sequences. In exemplary embodiments, the optical indicia or optical code includes delivery information that includes a delivery identification code and public and private cryptographic keys.

The exemplary drone 100 includes a drone wireless transceiver 112 that is operative to wirelessly communicate with receiving devices. It is conceived that in exemplary embodiments, during the approach of a drone 100, the drone 100 will transmit a signal 101 about which the drone 100 can detect a nearby receiving device 200. The signal 101 includes a verification code and a unique one time code that has been encrypted with a cryptographic key. The exemplary device 207 for receiving wirelessly transmitted signals will receive this signal from the drone 100.

Thereafter, the exemplary optical signaling device (i.e., the light emitter or light emitting diode 204) transmits an encrypted signal 204', also referred to as a light or optical signal, that includes the delivery or authorization information read and obtained by the device 208, for example at least one of the delivery identification code and the verification code, and the unique one time code received from the drone 100. The delivery identification code or the verification code, and the unique one time code are both encrypted with a public cryptographic key, and are referred to together as receptacle signal data. The light signal or encrypted signal 204' enables the receiving device 200 to make itself visible to the drone 100. In exemplary embodiments, the optical signaling device illuminates the opening 202 of the housing 201 by emitting the encrypted signal 204' thereby making the receiving device 200 visible to the drone 100.

In exemplary embodiments, after the drone recognizes the receiving device 200 and just before the final approach to the receiving device 200, the drone 100 lowers the parcel or package 1 hanging from a cable 2 or rope by operating a winch within the drone 100, similar to the operation of a crane. Preferably, the drone 100 does not lower the parcel or package 1 until within the range of about 1-2 meters of the receiving device 200 in order to protect the package or parcel 1 from sabotage. Through an automated maneuver, the drone 100 positions the parcel or package 1 hanging from the cable 2 within the opening 202 of the housing 201. Once the parcel or package 1 is positioned within the housing 201, a magnetic plate attached to a Velcro band that is wrapped around the package is operative to detach from an electromagnet 103 connected to the cable 2, thereby releasing the parcel or package 1 in the receiving device 200 with minimal acceleration and force.

The exemplary signal 101 that is sent by the drone to the all of the receiving devices within the vicinity of the drone includes a user specific identification code, also referred to as a verification code. The exemplary signal 101 also includes a further unique one time code that has been encrypted with a public cryptographic key. The further unique code is a one-time code that serves to ensure that each transmitted signal is different, and therefore cannot be copied by entities attempting to sabotage the automated drone delivery system. In exemplary embodiments, the user specific identification code or verification code, the further unique code, and cryptographic keys are provided to a processor of the drone by a delivery service provider prior to the drone being dispatched for delivery of the parcel or package.

In exemplary embodiments, any receiving device within the vicinity of the drone 100 is capable of receiving the signal 101 that is transmitted by the drone. However, only the receiving device that has previously been provided with a private cryptographic second key, that corresponds to the public cryptographic first key, and that is capable of decrypting the encrypted one time code encrypted with the public cryptographic first key is capable of decrypting the signal 101 transmitted by the drone. For example, only a receiving device 400 that has been previously provided with a corresponding private cryptographic key that was included in an optical code, read through operation of the optical scanner, is enabled to resolve the data corresponding to a one time code encrypted with the public cryptographic key included in the signal 101, i.e., the private and public keys must correspond to each other.

The intended recipient receiving device 200, in exemplary embodiments, that was previously provided with the user specific identification code and the cryptographic keys prior to delivery of the parcel or package received them through operation of the optical scanner reading an optical code. Specifically, in exemplary embodiments, the receiving device 200 receives the user specific identification code, delivery information, and cryptographic keys through operation of the optical scanner or device 208, which reads a bar code, QR code, or other optical code provided to an intended recipient by a delivery service provider during an ordinary process. The optical scanner is in operative connection with a computer 203. The user specific identification code, also referred to as a delivery identification code, and cryptographic keys are stored in the memory of the computer 203 of the receiving device 200. In exemplary embodiments, the transceiver or device 207 is also in operative connection with the computer 203. The computer 203 is operative to determine if the verification code received by the transceiver 207 corresponds to the user specific identification code stored in the computer 203. In response to this determination, if the verification code and the user specific identification code correspond, then the computer is operative to cause the receiving device 200 to transmit at least one of the user specific identification code and the verification code, and the further unique one time code, that have both been encrypted with the public cryptographic first key through a light emitter or light-emitting diode 204.

In exemplary embodiments, the light-emitting diode 204 illuminates, in the infrared range, an optically transparent ring 206 that borders the opening 202 of the housing 201. The encrypted user specific identification code or delivery identification code and the further unique code are diffused through the light emitting diode 204 in the form of a light signal. The drone 100 is enabled to receive and use the light signal to make a delivery determination that the light signal corresponds to the one time code and the verification code. The light signal is diffused through the optically transparent ring 206 and illuminates the opening 202 to help the drone 100 to further approach the receiving device 200 with sufficient precision to be able to insert the parcel or package 1 within the opening 202 of the housing 201. The exemplary drone 100 includes an optical navigation system with a 180° camera 114, shown in FIG. 1, that allows the drone to establish the exact location of the intended receiving device 200 by decrypting the encrypted light signals transmitted through the light-emitting diode 204.

In exemplary embodiments, the light emitting diode 204, also referred to as the light emitter, extends around the opening 202 of the receptacle 201 in surrounding relation. In alternative embodiments, the light emitter includes a translucent ring that extends around the opening 202 of the receptacle 201 in surrounding relation.

Figure 2:
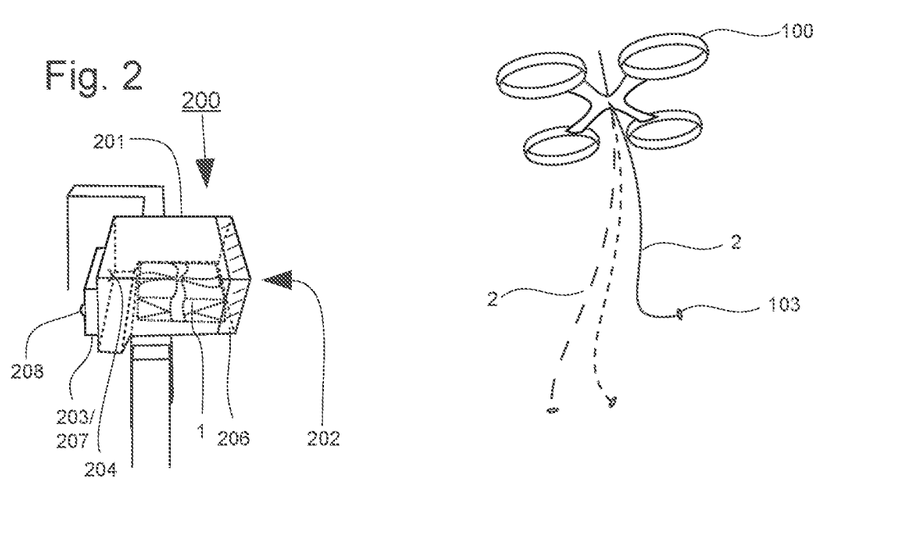
FIG. 2 shows the exemplary drone and the receiving device of FIG. 1 shortly after the delivery of the parcel or package.

FIG. 2 shows the exemplary receiving device 200 immediately after the drone 100 delivers a parcel or package 1. The parcel or package 1 is now in the receiving device 200 where it is protected from the weather until a user of the receiving device 200 removes the parcel or package 1 from the receiving device. The drone 100 moves away from the receiving device 200 and retracts the cable 2 that has the electromagnet 103 connected to the end. The drone 100 then flies back to its original location for further delivery. In order to avoid the cable 2 from getting caught in the rotors of the drone 100 (not shown here) and causing a crash, it is provided that in alternative embodiments, the electromagnet 103 is connected to the drone 100 itself. The cable 2 is disconnected from the electromagnet 103. In such embodiments, each delivery would result in the loss of a piece of cable 2, or a rope.

Figure 31:
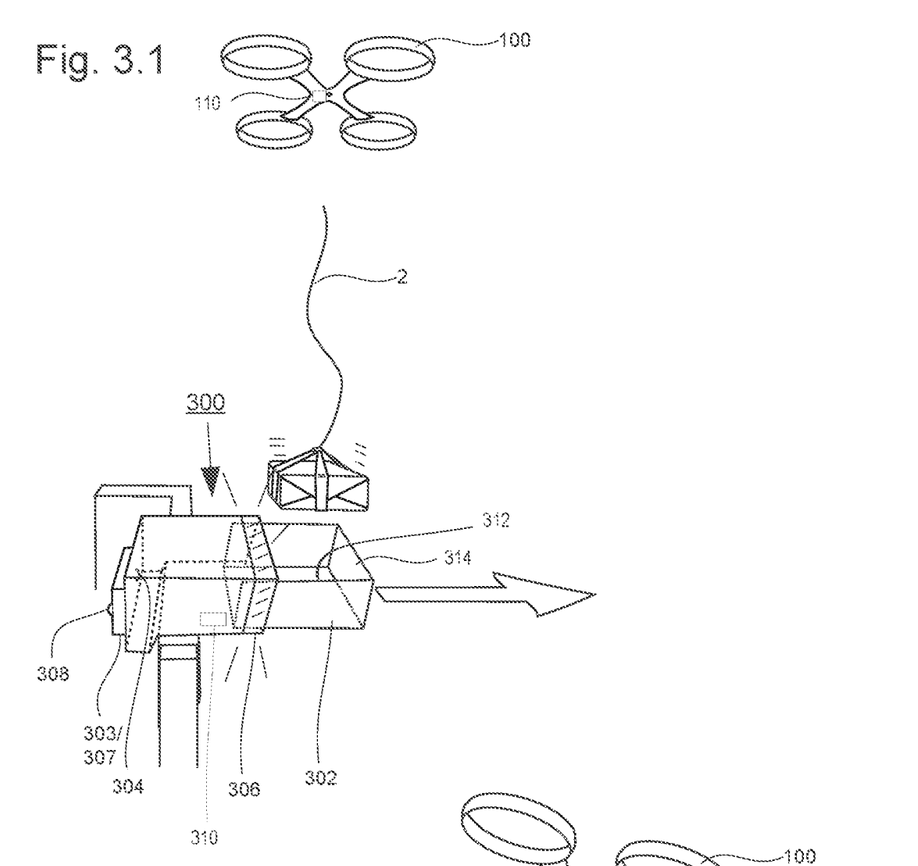
Figure 32:
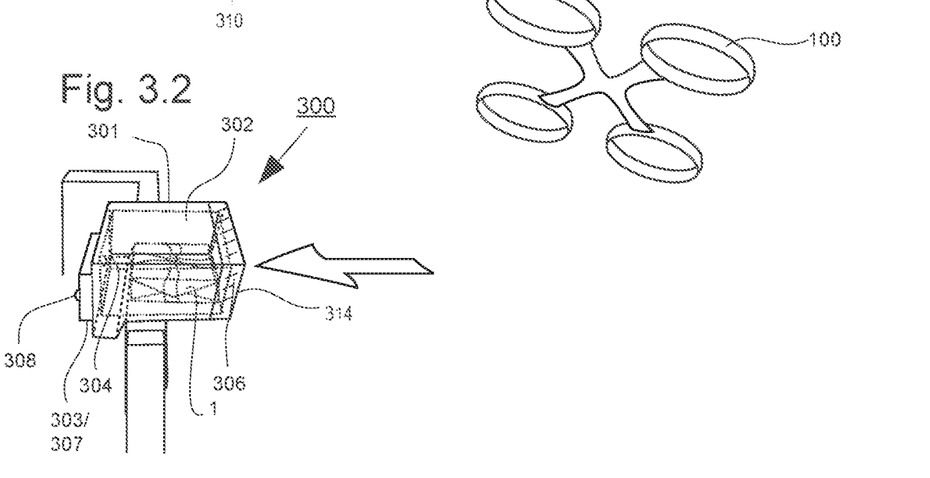

In FIG. 3.1, an exemplary drone 100 is shown approaching an exemplary alternative receiving device 300 for delivery. The alternative receiving device 300 includes a movable drawer 302 within the weatherproof housing 301. The exemplary drawer 302 has essentially two functions. First, in an extended position in which the drawer is slid out of the housing 301, the drawer 302 forms an opening that acts as a collecting container for a parcel or package 1 to be unloaded into the drawer 302. The exemplary drawer includes a drawer piece 312 that is configured to receive a package thereon. The exemplary drawer further includes a drawer end piece 314 that, when the drawer is in a retracted position as shown in FIG. 3.2, closes the opening of the receptacle 401. With the drawer 302 in its extended position, it is easier for the drone 100 to carry out the delivery maneuver than the drone delivery maneuver discussed in connection with FIG. 1. During the delivery maneuver shown in FIG. 3.1, the delivery is again similar to the function of positioning an object with an "Air Crane," as has been successfully completed in Mars missions. As shown in FIG. 3.1, the exemplary drone 100 lowers the parcel or package 1 on cable 2 only when the drone gets within 1 to 2 m of the receiving device 300, in order to prevent potential sabotage during delivery. It is also provided in this embodiment that the cable 2 is dropped with the parcel or package 1 into the drawer 302. Therefore, the drone 100 is not at risk of crashing as a result of the cable 2 getting caught in the rotors of the drone 100 when it is retracted by the winch. In certain alternative embodiments where the cable 2 is not released during delivery, the rotors of the drone are configured to direct the downward wind produced by the rotation of the rotors to keep the cable 2 away from the rotors while it is retracted by the winch, thereby preventing the cable 2 from getting caught in the rotors.

In exemplary embodiments, once the parcel or package 1 has been delivered, the drone 100 signals the receiving device 300 with a release signal, and the receiving device 300 causes the drawer 302 to close. Thus, with the drawer 302 closing the opening of the receiving device, the parcel or package 1 is protected from the weather and from rain, which could be blown by wind into the open drawer 302. The automatic retraction of the drawer 302 can also be triggered by sensors 310, shown in FIG. 3.1, included on the receiving device 300 that detect the package has been placed in the receiving device 300. However, in order to prevent the receiving device 300 from prematurely closing the drawer 302, thereby causing an unsuccessful delivery attempt, it is more advantageous for a drone sensor system 110, shown in FIG. 3.1, included on the drone 100 to signal the receiving device, through the use of a release signal, that the package has been successfully delivered and to issue the command to close the drawer 302 of the receiving device 300. Similar to the receiving device 200 in FIGS. 1 and 2, receiving device 300 also includes a computer 303 in operative connection with a device or transceiver 307 for receiving wirelessly transmitted signals, a device 308 for the wired, optical, or wireless reception of authorization information, and a light emitter 204.

In FIG. 3.2, the exemplary receiving apparatus of FIG. 3.1 is shown immediately after the delivery of a parcel or package 1. However, in the exemplary embodiments shown in FIG. 3.2, the drawer 302 of the receiving device 300 is closed, as indicated by the arrow, and the drone 100 moves away from the location of the receiving device.

Figure 4:
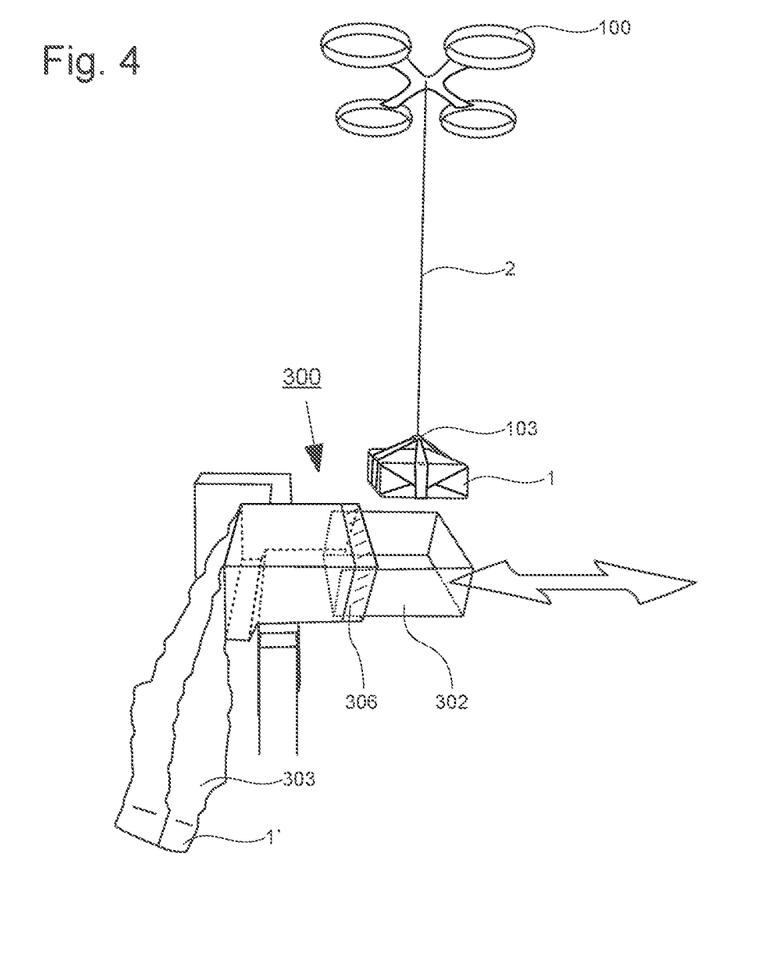
FIG. 4 shows the exemplary alternative receiving device of FIG. 3.1 with a bag for holding additional parcels or packages connected thereto.

FIG. 4 shows an alternative embodiment of the receiving device 300 shown FIGS. 3.1 and 3.2. The receiving device 300 shown in FIG. 4 has an additional collecting bag 303 also referred to as a collection container, or similar device for receiving parcels or packages that have been previously placed inside the drawer 302 by a drone 100. In this embodiment, the exemplary drawer 302 moves previously received parcels or packages 1 from the drawer 302 out of the drawer 302 into the bag 303. In this embodiment, a parcel or package 1 that has been previously received in the drawer 302 is moved into the collecting bag 303 or similar device clearing the interior area of drawer 302 thereby allowing for another delivery. The collection bag 303 or similar device for receiving additional parcels or packages is advantageous in that when multiple deliveries take place in a narrow time window that would otherwise fill up the interior area of the drawer 302, thereby making it impossible to receive any more packages, the interior area of the receiving device 300 is cleared and is capable of receiving delivery of another parcel. FIG. 4 shows how a parcel or package 1' that was previously received in the drawer 302 has now been moved into the collecting bag 303.

Figures 5, 6:
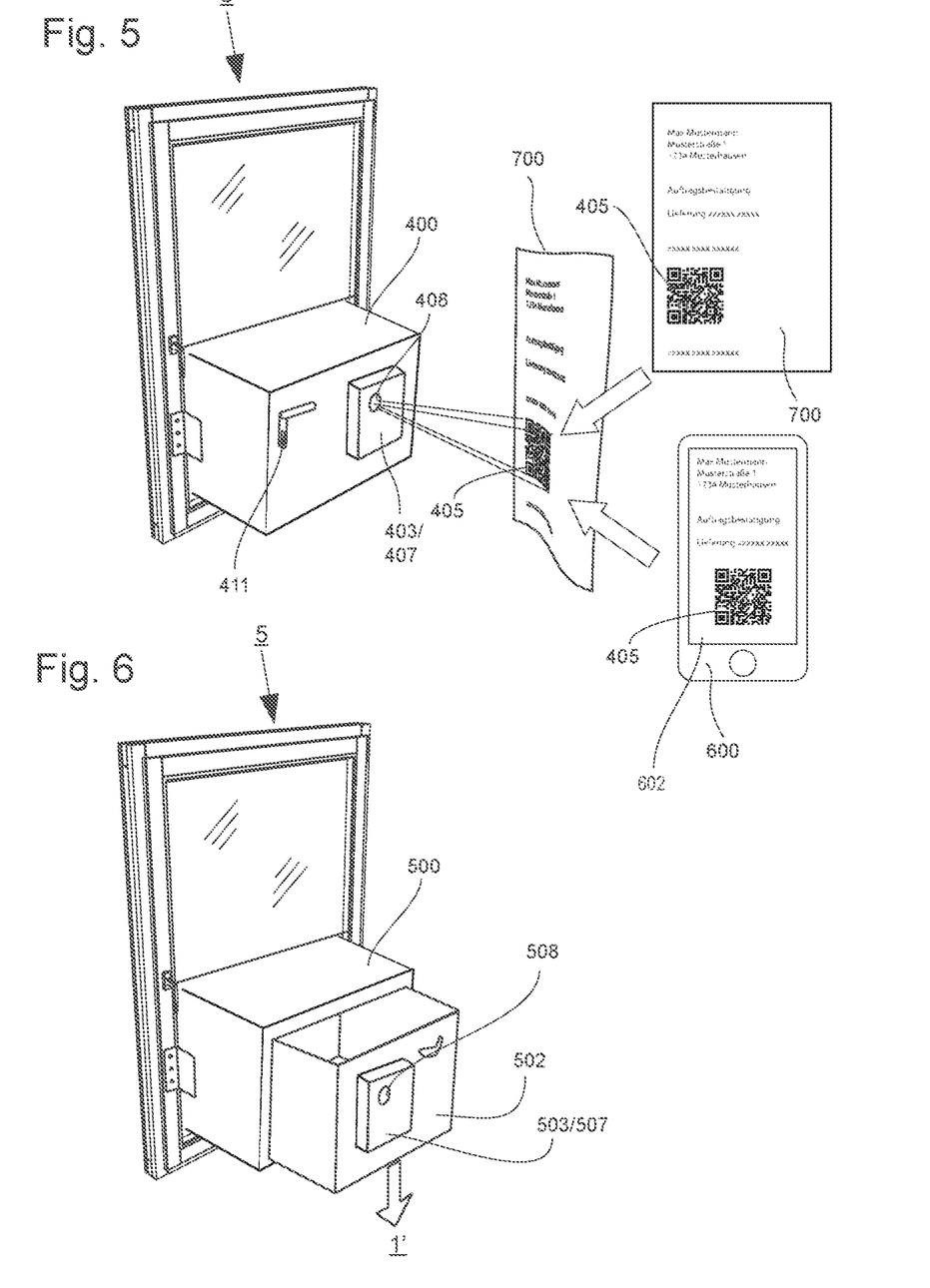
FIG. 5 shows an exemplary alternative receiving device integrated into a conventional window, the exemplary alternative receiving device includes an exemplary optical scanner that is operative to read a QR Code® that includes delivery information from an order confirmation or invoice.
FIG. 6 shows the exemplary alternative receiving device of FIG. 5.

FIG. 5 shows a further exemplary alternative receiving device 400. Instead of being mounted on a balcony, the exemplary receiving device 400 is integrated into a conventional window 5 of a building or other structure, similar to a small air conditioning unit. FIG. 5 further shows an exemplary invoice for an order or an order confirmation 700 that includes an optical, machine-readable code 405. FIG. 5 illustrates how the receiving station 400 attains authorization information, cryptographic keys, and delivery information. FIG. 5 illustrates how after completing an online order for a product or other good, a user receives a bar code, QR code, or other optical code in the invoice or order confirmation 700. The user may then scan the bar code, QR code, or other optical code into the device 508 for the wired, optical, or wireless reception of authorization information. The optical scanner or device 408 is operative to read the machine-readable code 405 contained within the barcode, QR code, or other optical code of the order invoice or the order confirmation 700. The exemplary optical scanner or device 408 is also operative to read a bar code, QR code, or other optical code that is displayed on a display 602 of a mobile phone 600. A computer 403 with sufficient memory is provided within the receiving device 400 that is capable of storing the information contained in the code 405. The code 405 includes delivery information including a user specific identification code or delivery identification code, a public cryptographic first key, a private cryptographic second key, and in certain embodiments, drone credentials. The barcode, QR code, or other optical code that includes code 405 is provided by a delivery service provider to the intended recipient during the ordering process. The delivery service provides includes a server that is operative to wirelessly communicate the barcode, QR code, or other optical code to a computer or mobile phone of the intended recipient used during the ordering process. In alternative embodiments, instead of a printed order confirmation, it is also possible to transmit the information in code 405 to the receiving device 400 through a system similar to those used for transmission of a ticket for a flight or for a ticket for a concert to a mobile phone 600.

Through use of the information in the code 405, a mutual authorization between the drone and the receiving device is established prior to delivery of the parcel or package 1. In exemplary embodiments, this mutual authorization procedure between receiving device 400 and the drone 100 prior to delivery takes place in the following sequence. In a first step, the verification code and a further unique one time code which has been encrypted with the public cryptographic first key are transmitted by the drone 100 to all of the receiving devices in the vicinity of the drone 100. However, the one time code included in the signal 101 can only be decrypted by the receiving device 400 that was previously provided with a corresponding private cryptographic second key through the optical code that was read by the optical scanner 408, which took place during an ordering process or soon thereafter. The mutual authorization sequence is continued when the transceiver 407 of the receiving device 400 receives the signal 101 sent by the drone with the verification code and the further unique one time code that has been encrypted with the public cryptographic first key.

If the computer 403 determines that the verification code corresponds to the user-specific identification code or delivery identification code stored in the computer memory, then the computer 403 uses the private cryptographic second key to decrypt the data corresponding to the further unique one time code that was encrypted with the public cryptographic first key. Then, using the public cryptographic first key, the computer 403 encrypts the unique one time code and encrypts at least one of the deliver identification code and the verification code to produce receptacle signal data. The computer 403 then causes the optical signaling device to transmit the receptacle signal data through a light-emitting diode or light emitter 404 that illuminates the opening 202 in the infrared range.

The exemplary receiving device 400, shown in FIG. 5, is similar to a mailbox in that it is opened through the use of a latch 410. The receiving device 400 further includes a lock 411 for securing the parcel or package 1 in the interior area of the receiving device when the receiving device is not in use. A user who opens the receiving device 400 through the use of the latch 410, is able to remove the parcel or package 1 that is contained therein. Receiving device 400 also includes a device 407 for receiving wirelessly transmitted signals and a device 408 for the wired, optical, or wireless reception of authorization information that are both in operative connection with the computer 400.

FIG. 6 shows a further exemplary alternative receiving device 500, which is very similar to the receiving device 400 of FIG. 5. However, the exemplary receiving device 500 has a drawer 502, in which a parcel or package 1, not shown here, within the interior area of the drawer 502 is moved from the drawer 502 into the housing unit through a window of the housing unit in which the receiving device 500 is positioned. In this embodiment, a pillow or soft pad is placed below the window inside the housing unit in which the receiving device 500 is positioned. A parcel or package 1 that has been received in the drawer 502 is dropped from the receiving device 500 through the window onto the pad. Therefore, the drawer 502 of the receiving device 500 is advantageous in that a plurality of parcels or packages 1 can be received in a short amount of time without the drawer 502 of the receiving device 500 filling up and preventing other packages from being delivered. This receiving device 500 also includes a computer 503 in operative connection with a device or transceiver 507 for receiving wirelessly transmitted signals, a device or optical scanner 508 for the wired, optical, or wireless reception of authorization information, and a light emitter 504.

Figure 7:
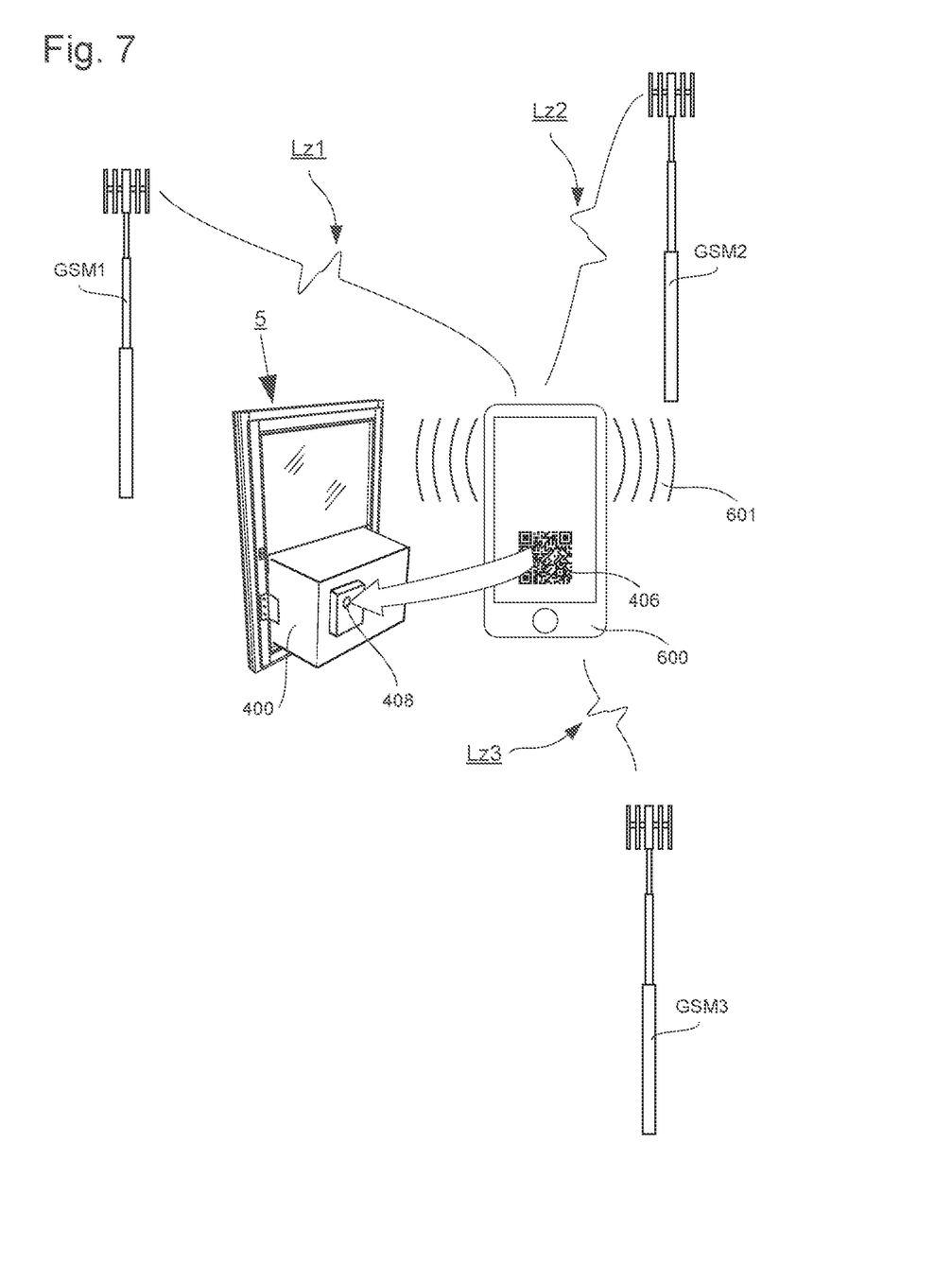
FIG. 7. shows a sketch of the exemplary necessary components and exemplary method of the initial set up of a receiving device.

FIG. 7 shows a sketch of the necessary exemplary components and exemplary method for the initial set up of a receiving device 400. The exact geographic coordinates of a receiving device 400 are not known before it is first set up. Therefore, it is necessary to register the receiving device 400 with a delivery service provider. The registration process begins with first registering the receiving device 400 with a local delivery service provider which can be done via the Internet, over the phone, at a business office, or in writing. Then, a user specific identification code or delivery identification code that corresponds to the receiving device is communicated to the user through operation of a server that is associated with the delivery service provider. The user specific code that is provided to the user can be transferred as optical, machine-readable code, as an electronic code, or by a sequence of numbers and/or letters.

In the exemplary embodiment, once the user has been issued a user specific identification code or delivery identification code corresponding to the receiving device, the user then establishes a wireless communication between a mobile phone 600 and the server associated with the delivery service provider, for example, the user calls a predetermined telephone number associated with the server of the delivery service provider using the mobile telephone 600. The mobile telephone 600 should be positioned in extremely close proximity to the receiving device (within a few inches) to ensure that the exact, pinpoint geographic location of the receiving device is established. If a connection or wireless communication is established between the mobile phone 600 and the predetermined telephone number associated with the server of the delivery service provider, the user specific code provided to the user is input by the user into the keyboard of the mobile telephone 600 and is communicated to the server.

After identifying the user specific identification code or the delivery identification code, the delivery service provider locates the mobile telephone 600, preferably by Enhanced Obedient Time Difference Method (EOTD) of the GSM location. For example, the mobile phone 600 sends out signals 601 whose transit time differences Lz1, Lz2, and Lz3 are measured. This type of method for establishing location, relies on the corresponding time differences of the arrival of radio signals to different transmission towers of a GSM network, thereby establishing the location of the mobile phone. FIG. 7 shows transit time differences Lz1, Lz2, and Lz3 to the towers GSM1, GSM2, and GSM3. Thereafter, the server is operative to register the location of the mobile phone 600 as the location of the receptacle of receiving device 400.

In alternative embodiments, it is also possible to establish geo-coordinates of a receiving device through GPS or a combined method of GPS and WLAN. In the case of WLAN localization, known wireless local area networks whose exact geographic coordinates are known are used as positioning aids. An alternative to calling via a cell phone, is to input an Internet URL that incorporates the user specific code as part of the URL into an Internet search engine application of a mobile device or computer. The server associated with the delivery service provider includes data corresponding to the URL link and the user specific identification code, also referred to as the delivery identification code. The URL link corresponds to the delivery identification code. In this case, however, it must be ensured that the device in which the URL is input is positioned within a few inches of the receiving device and is able to automatically communicate geo-location information on request, as is the case with a corresponding website description language JavaScript command in HTML 5. After the URL link is accessed, the server associated with the delivery service provider is enabled to determine the location of the recipients computer with which the URL link was accessed, and to register the location of the recipient computer as the location of the receptacle or receiving device 400.

In the exemplary embodiment, after the initial set up of the receiving device 400, the delivery service provider is enabled to operate the server or other devices to dispatch drones for delivery by causing the drone to move to the correct receptacle or receiving device 400 for delivery of a package. The delivery service provider is also responsible for communicating the optical indicia or optical code to the intended recipient soon after the ordering process so that they may scan in the optical code containing the delivery information through operation of the optical scanner and computer. The delivery information enables the receiving device 400 and the drone 100 to communicate in the manner previously described to successfully complete delivery of the parcel or package to the correct receiving device.

Thus, the elements, features, and characteristics of the exemplary embodiments described achieve desirable results, eliminate difficulties encountered in the use of the prior art devices and systems, solves problems, and attain one or more useful objectives as described herein.

In the foregoing description, certain terms have been used for brevity, clarity, and understanding. However, no unnecessary limitations are to be implied therefrom because such terms are used for descriptive purposes and are intended to be broadly construed. Moreover, the descriptions and illustrations given herein are by way of examples and the useful features are not limited to the exact details shown and described.

Further, in the description, words that refer to left/right, top/bottom, up/down or similar terms indicating relative locations of items shall not be deemed limiting and it is to be understood that exemplary embodiments can be configured and used in numerous different orientations.

Having described the features, discoveries, and principles of the exemplary embodiments, the manner in which they are constructed, operated and utilized, and the advantages and useful results attained, the new and useful structures, devices, elements, arrangements, parts, combinations, systems, equipment, operations, methods, processes and relationships are set forth in the appended claims.

The invention claimed is:

1. Apparatus comprising:
   a receptacle configured to receive a package delivered via an airborne drone,
      wherein the drone includes a drone wireless transceiver and a camera configured to receive light signals,
      wherein the receptacle includes an interior area and an opening through which the interior area may be accessed,
   an optical scanner,
      wherein the optical scanner is operative to read optical indicia,
   a transceiver,
      wherein the transceiver is operative to communicate with the drone wireless transceiver through wireless signals,
   at least one light emitter,
      wherein the at least one light emitter
         is positioned adjacent to the opening, and
         is operative to output light signals that illuminate at least a portion of the opening,
   a computer,
      wherein the computer is in operative connection with the optical scanner, the transceiver, and the at least one light emitter,
      wherein the computer is operative to cause
         at least one optical code to be read through operation of the optical scanner,
            wherein the at least one optical code includes data corresponding to a delivery identification code associated with the package, and at least one cryptographic key,
         the transceiver to receive from the drone wireless transceiver, data corresponding to a verification code and an encrypted one time code, wherein the one time code is encrypted with the at least one cryptographic key,
         a determination that the data corresponding to the delivery identification code and the verification code have a predetermined relationship,
         the data corresponding to the one time code to be resolved using the at least one cryptographic key,
         responsive at least in part to the determination, encryption of the resolved data corresponding to the one time code and at least one of the verification code and the delivery identification code using the at least one cryptographic key, to produce receptacle signal data,
         the at least one light emitter to output at least one light signal corresponding to the receptacle signal data,
      whereby the drone is enabled to receive and use the at least one light signal to make a delivery determination that the at least one light signal corresponds to the one time code and the verification code, and to cause the package to be positioned in the interior area through the opening responsive at least in part to the delivery determination.

2. The apparatus according to claim 1
   wherein the at least one light emitter extends around the opening of the receptacle in surrounding relation.

3. The apparatus according to claim 1
   wherein the at least one light emitter comprises a translucent ring that extends around the opening of the receptacle in surrounding relation.

4. The apparatus according to claim 1
   wherein the at least one optical code includes at least one of
      a barcode, and
      a QR code.

5. The apparatus according to claim 1
   further including a collection container,
      wherein the collection container
         is in operative connection with the receptacle on a side of the receptacle opposite the opening,
         extends outside of the receptacle, and
         is in spatial connection with the interior area,
      wherein packages received in the interior area are movable from the interior area to the collection container.

6. The apparatus according to claim 1 and further comprising:
   a drawer,
      wherein the drawer includes a drawer piece and is movably mounted in operative connection with the receptacle,
      wherein the drawer is movable between an extended position and a retracted position, wherein in the extended position the drawer piece of the drawer extends outward from the opening,
      wherein the drawer piece in the extended position of the drawer is configured to support the package thereon,
      wherein with the package supported on the drawer piece, movement of the drawer from the extended position to the retracted position is operative to cause the package to move within the interior area.

7. The apparatus according to claim 1 and further comprising:
   a drawer,
      wherein the drawer includes a drawer piece and a drawer end piece and is movably mounted in operative connection with the receptacle,
      wherein the drawer is movable between an extended position and a retracted position, wherein in the extended position the drawer piece of the drawer extends outward from the opening,
      wherein the drawer piece in the extended position of the drawer is configured to support the package thereon,
      wherein with the package supported on the drawer piece, movement of the drawer from the extended position to the retracted position is operative to cause the package to move within the interior area,
      wherein in the retracted position the drawer piece extends in the receptacle and the drawer end piece closes the opening.

8. The apparatus according to claim 1
wherein the receptacle is operatively configured to, at least one of
fit in a window of a structure,
connect to a balcony railing, or
connect to an exterior surface of a structure.

9. The apparatus according to claim 1 further including
a server, and
a mobile phone,
wherein the server is associated with a delivery service provider,
wherein the server includes data corresponding to the delivery identification code,
wherein the mobile phone is operative to wirelessly communicate with the server,
wherein during wireless communication with the server,
the server is operative to communicate data corresponding to the delivery identification code to the mobile phone,
thereafter, with the mobile phone adjacent the receptacle, the mobile phone is operative to communicate data corresponding to the delivery identification code to the server,
wherein responsive at least in part to communication of the data corresponding to the delivery identification code to the server, the server is operative to determine a location of the mobile phone,
wherein the server is operative responsive at least in part to the determined location of the mobile phone to cause the drone to move to the location,
whereby the drone is caused to move into proximity with the receptacle.

10. The apparatus according to claim 1 further including
a server, and
a mobile phone,
wherein the mobile phone includes a display,
wherein the server is associated with a delivery service provider,
wherein the server includes data corresponding to the delivery identification code,
wherein the mobile phone is operative to wirelessly communicate with the server,
wherein during wireless communication with the server,
the server is operative to communicate data corresponding to the delivery identification code to the mobile phone,
thereafter, with the mobile phone adjacent the receptacle, the mobile phone is operative to communicate data corresponding to the delivery identification code to the server,
wherein responsive at least in part to communication of the data corresponding to the delivery identification code to the server, the server is operative to determine a location of the mobile phone,
wherein the server is operative responsive at least in part to the determined location of the mobile phone to cause the drone to move to the location, whereby the location is in proximity to the receptacle,
wherein the mobile phone is operative to output the at least one optical code on the mobile phone display,
wherein the optical scanner is operative to read the at least one optical code output on the mobile phone display.

11. The apparatus according to claim 1 further including
a server, and
a recipient computer, wherein the recipient computer is in close proximity to the receptacle,
wherein the server is associated with a delivery service provider,
wherein the server includes data corresponding to a URL link and the delivery identification code,
wherein the URL link is operative to provide data corresponding to the delivery identification code,
wherein the recipient computer is operative to wirelessly communicate with the server,
wherein the recipient computer is operative to access the URL link through an internet network and receive the data corresponding to the delivery identification code,
wherein responsive at least in part to access of the URL link, the server is operative to determine a location of the recipient computer,
wherein the server is operative responsive at least in part to the determined location of the recipient computer to cause the drone to move to the determined location.

12. The apparatus according to claim 1
wherein the receptacle includes at least one sensor,
wherein the at least one sensor is in operative connection with at least one of the
interior area, and
the opening,
wherein the at least one sensor is operative to detect when a package has been received in the interior area.

13. The apparatus according to claim 1
wherein the drone includes at least one drone sensor,
wherein the at least one drone sensor is operative to detect when the drone has released a package in the interior area, and
wherein the drone transceiver is operative to transmit a release signal to the transceiver to signal completion of the package delivery.

14. The apparatus according to claim 1
wherein the at least one cryptographic key includes
a public cryptographic key, and
a corresponding private cryptographic key.

15. The apparatus according to claim 1
wherein the at least one cryptographic key includes
a public cryptographic key, and
a corresponding private cryptographic key
wherein the data corresponding to the encrypted one time code received by the transceiver from the drone is encrypted with the public cryptographic key,
wherein the computer is operative to cause the data corresponding to the one time code to be resolved using the private cryptographic key,
wherein responsive at least in part to the determination, the computer is operative to encrypt the resolved data corresponding to the one time code and at least one of the verification code and the delivery identification code using the public cryptographic key.

16. A method carried out using an apparatus, wherein the apparatus includes:
a receptacle configured to receive a package delivered via an airborne drone, wherein the drone includes a drone wireless transceiver
and a camera configured to receive light signals,
wherein the receptacle includes an interior area and an
opening through which the interior area may be
accessed,
an optical scanner,
wherein the optical scanner is operative to read optical
indicia,
a transceiver,
wherein the transceiver is operative to communicate
with the drone wireless transceiver through wireless
signals,
at least one light emitter,
wherein the at least one light emitter
is positioned adjacent to the opening, and
is operative to output light signals that illuminate at
least a portion of the opening,
a computer,
wherein the computer is in operative connection with
the optical scanner, the transceiver, and the at least
one light emitter,
wherein the computer is operative to cause
at least one optical code to be read through operation
of the optical scanner,
wherein the at least one optical code includes data
corresponding to a delivery identification code
associated with the package, and at least one
cryptographic key,
the transceiver to receive from the drone wireless
transceiver, data corresponding to a verification
code and an encrypted one time code, wherein the
one time code is encrypted with the at least one
cryptographic key,
a determination that the data corresponding to the
delivery identification code and the verification
code have a predetermined relationship,
the data corresponding to the one time code to be
resolved using the at least one cryptographic key,
responsive at least in part to the determination,
encryption of the resolved data corresponding to
the one time code and at least one of the verification code and the delivery identification code
using the at least one cryptographic key, to produce receptacle signal data,
the at least one light emitter to output at least one
light signal corresponding to the receptacle signal
data,
whereby the drone is enabled to receive and use the at
least one light signal to make a delivery determination
that the at least one light signal corresponds to the one
time code and the verification code, and to cause the
package to be positioned in the interior area through the
opening responsive at least in part to the delivery
determination, and further including
a server, and
a mobile phone,
wherein the mobile phone includes a display,
wherein the server is associated with a delivery
service provider,
wherein the server includes data corresponding to the
delivery identification code,
wherein the mobile phone is operative to wirelessly
communicate with the server,
the method comprising:
a) establishing wireless communication between the
mobile phone and the server,
b) receiving with the mobile phone through the wireless
communication, the delivery identification code
from the server,
c) positioning the mobile phone adjacent the receptacle,
d) during at least a portion of (c), wirelessly communicating the delivery identification code to the server,
e) determining with the server, a location of the mobile
phone during (d),
d) using the determined location of the mobile phone
through operation of the server to cause the drone to
move to the location.
17. A method carried out using an apparatus, wherein the
apparatus includes:
a receptacle configured to receive a package delivered via
an airborne drone,
wherein the drone includes a drone wireless transceiver
and a camera configured to receive light signals,
wherein the receptacle includes an interior area and an
opening through which the interior area may be
accessed,
an optical scanner,
wherein the optical scanner is operative to read optical
indicia,
a transceiver,
wherein the transceiver is operative to communicate
with the drone wireless transceiver through wireless
signals,
at least one light emitter,
wherein the at least one light emitter
is positioned adjacent to the opening, and
is operative to output light signals that illuminate at
least a portion of the opening,
a computer,
wherein the computer is in operative connection with
the optical scanner, the transceiver, and the at least
one light emitter,
wherein the computer is operative to cause
at least one optical code to be read through operation
of the optical scanner,
wherein the at least one optical code includes data
corresponding to a delivery identification code
associated with the package, and at least one
cryptographic key,
wherein the at least one cryptographic key
includes
a public cryptographic key, and
a corresponding private cryptographic key,
the transceiver to receive from the drone wireless
transceiver, data corresponding to a verification
code and an encrypted one time code, wherein the
one time code is encrypted with the public cryptographic key,
a determination that the data corresponding to the
delivery identification code and the verification
code have a predetermined relationship,
the data corresponding to the one time code to be
resolved using the private cryptographic key,
responsive at least in part to the determination,
encryption of the resolved data corresponding to
the one time code and at least one of the verification code and the delivery identification code
using the private cryptographic key, to produce
receptacle signal data,
the at least one light emitter to output at least one
light signal corresponding to the receptacle signal
data, whereby the drone is enabled to receive and use the at least one light signal to make a delivery determination that the at least one light signal corresponds to the one time code and the verification code, and to cause the package to be positioned in the interior area through the opening responsive at least in part to the delivery determination, the method comprising the steps of:
- a) receiving with a mobile phone the delivery identification code, the public cryptographic key and the private cryptographic key from a server associated with a delivery service provider responsible for delivering the package,
- b subsequent to (a) generating the optical code through operation of the mobile phone,
- c) presenting the generated optical code to the optical scanner,
- d) reading the optical code through operation of the optical scanner to obtain the data corresponding to the delivery identification code and the public and private cryptographic keys,
- e) receiving through operation of the transceiver the data corresponding to the verification code and the encrypted one time code from the drone,
- f) making the determination through operation of the computer that the data corresponding to the delivery identification code and the verification code have the predetermined relationship,
- g) decrypting the encrypted one time code through operation of the computer through use of the private cryptographic key to resolve the data corresponding to the one time code responsive at least in part to the determination,
- h) encrypting through operation of the computer the resolved data corresponding to the one time code and at least one of the verification code and the delivery identification code using the public cryptographic key to produce receptacle signal data responsive at least in part to the determination,
- i) outputting through operation of the light emitter at least one light signal corresponding to the receptacle signal data,
- j) using the at least one light signal through operation of the drone to make a delivery determination that the at least one light signal corresponds to the one time code and the verification code,
- k) positioning the package through operation of the drone in the interior area through the opening responsive at least in part to the delivery determination.

18. Apparatus comprising:
a receptacle configured to receive a package delivered via an airborne drone,
  wherein the drone includes a drone wireless transceiver and a camera configured to receive light signals,
  wherein the receptacle includes
    an interior area and an opening through which the interior area may be accessed,
an optical scanner,
  wherein the optical scanner is operative to read optical indicia,
a transceiver,
  wherein the transceiver is operative to communicate with the drone wireless transceiver through wireless signals,
at least one light emitter,
  wherein the at least one light emitter
    is positioned adjacent to the opening, and
    is operative to output light signals that illuminate at least a portion of the opening,
a computer,
  wherein the computer
    is in operative connection with the optical scanner, the transceiver, and the at least one light emitter,
    includes a computer memory,
    is operative to cause
      the optical scanner to read an optical code,
        wherein the optical code includes data corresponding to delivery information,
        wherein the delivery information includes a delivery identification code, a public cryptographic key, and a corresponding private cryptographic key,
      the transceiver to wirelessly receive from the drone
        a non-encrypted signal,
          wherein the non-encrypted signal includes data corresponding to a verification code,
        an encrypted signal,
          wherein the encrypted signal
            is encrypted with the public cryptographic key, and
            includes data corresponding to a one time code,
      the computer memory to store
        the data corresponding to the delivery information,
        the data corresponding to the receptacle verification code, and the encrypted signal,
  wherein the computer is further operative to
    make a determination that the data corresponding to the verification code and the delivery identification code have a predetermined relationship,
    responsive in part to the determination, use the private cryptographic key to decrypt the data corresponding to the encrypted signal to resolve the data corresponding to the one time code, and to store the resolved one time code in the computer memory,
    using the private cryptographic key, produce receptacle signal data that includes an encrypted version of the verification code and an encrypted version of the resolved one time code,
    responsive in part to the determination, to cause the at least one light emitter to emit a light signal,
      wherein the light signal
        corresponds to the receptacle signal data, and
        illuminates at least a portion of the opening,
whereby the drone is enabled to receive and use the light signal to make a delivery determination that the light signal corresponds to the one time code and the verification code, and to position the package in the interior area through the opening responsive at least in part to the delivery determination.

19. The apparatus according to claim 18
wherein the at least one light emitter extends around the opening of the receptacle in surrounding relation.

20. The apparatus according to claim 18 wherein the at least one light emitter comprises a translucent ring that extends around the opening of the receptacle in surrounding relation.

\* \* \* \* \*